United States Patent [19]

Truitt

[11] 4,067,111
[45] Jan. 10, 1978

[54] PENDULUM DEVICE

[76] Inventor: Thomas E. Truitt, Suite 140 Crown Center West Village, 2450 Grand Ave., Kansas City, Mo. 64108

[21] Appl. No.: 663,515

[22] Filed: Mar. 3, 1976

Related U.S. Application Data

[63] Continuation-in-part of Ser. No. 576,725, May 12, 1975, abandoned.

[51] Int. Cl.² .............................................. B43L 11/00
[52] U.S. Cl. ....................................................... 33/27 L
[58] Field of Search ............. 33/24 B, 27 L; 35/19 R; 46/131, 237, 238, 242

[56] References Cited

U.S. PATENT DOCUMENTS

| 898,599 | 9/1908 | Pearce | 33/27 L |
|---|---|---|---|
| 1,869,951 | 8/1932 | Worington | 33/27 L |
| 3,143,807 | 8/1964 | Christie | 33/27 L |
| 3,324,556 | 6/1967 | Everett | 33/27 L |
| 3,384,966 | 5/1968 | Lias | 33/27 L |
| 3,494,037 | 2/1970 | Arber | 33/27 L |
| 3,496,641 | 2/1970 | Mills | 33/27 L |

OTHER PUBLICATIONS

Welch Scientific Apparatus & Supplies Cat., Oct. 1965, Sand Pendulum 0833, p. 89.

Cundy & Rollett, Mathematical Models, 1957, pp. 228-231.
Truitt, Device Entered in Application as Prior Art, 1972, "Retrospect."

*Primary Examiner*—Charles E. Phillips
*Attorney, Agent, or Firm*—D. A. N. Chase

[57] ABSTRACT

In a kinetic sculpture apparatus, the lower end of a pendulum provides a scribe having a tapered tip that penetrates the surface of a bed of fine, particulate material to make an intricate pattern in the bed whose configuration is determined by the location of the pendulum's primary horizontal axis, the position from which the pendulum is released, and the depth of penetration of the tip of the scribe. A selectable pair of low friction, point bearings define the primary axis, and the intricacy of the patterns is enhanced by a resilient, upright standard that sways with the directional pull of the pendulum. The elevation of the pendulum is controllable in order to set the depth of penetration of the scribe and thereby control the depth and width of the lines of the patterns. In one modified embodiment, the weight of the pendulum may also be varied in accordance with the pattern configuration desired. A setup device is provided to suitably prepare the bed of particulate material for sculpturing.

15 Claims, 19 Drawing Figures

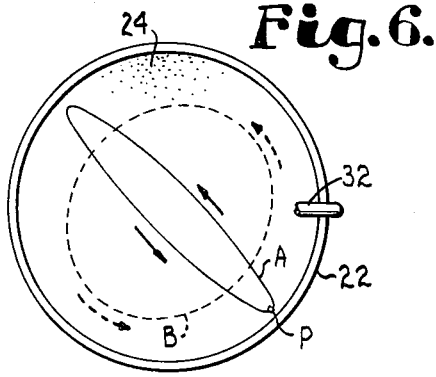
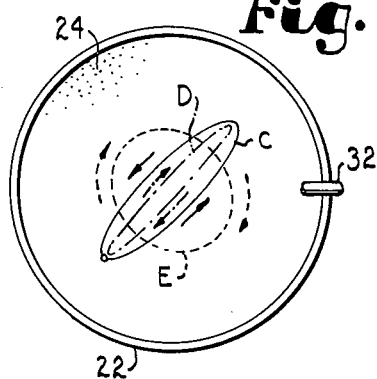
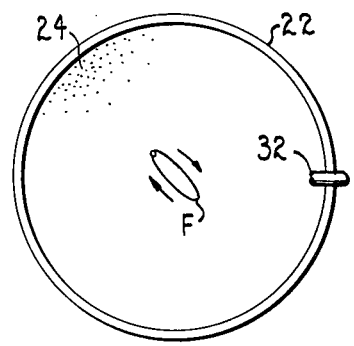
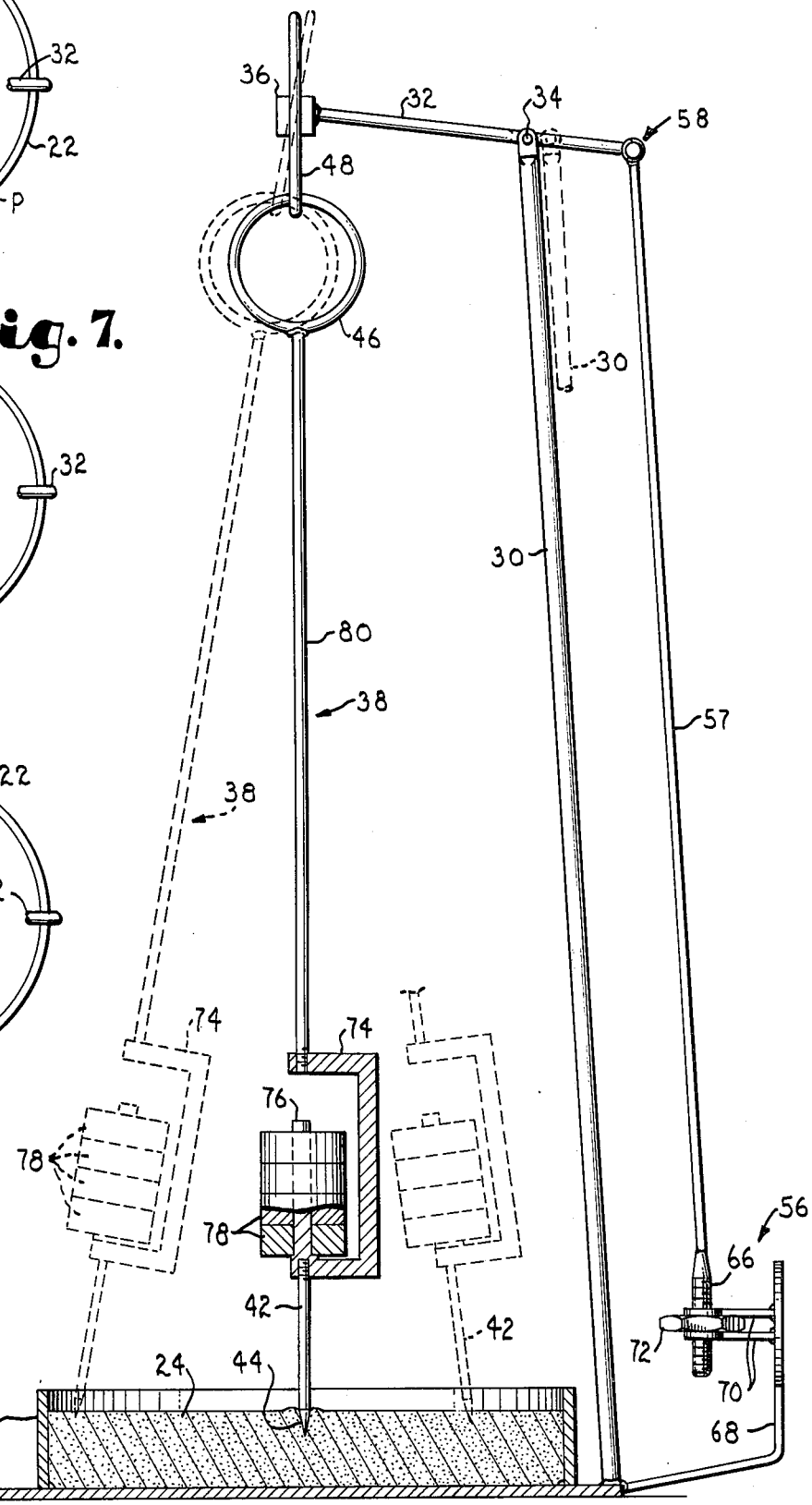

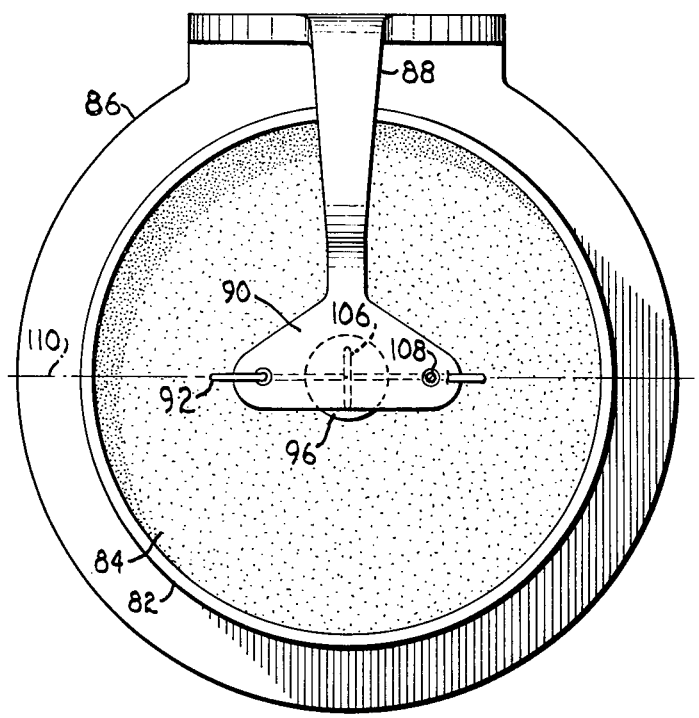
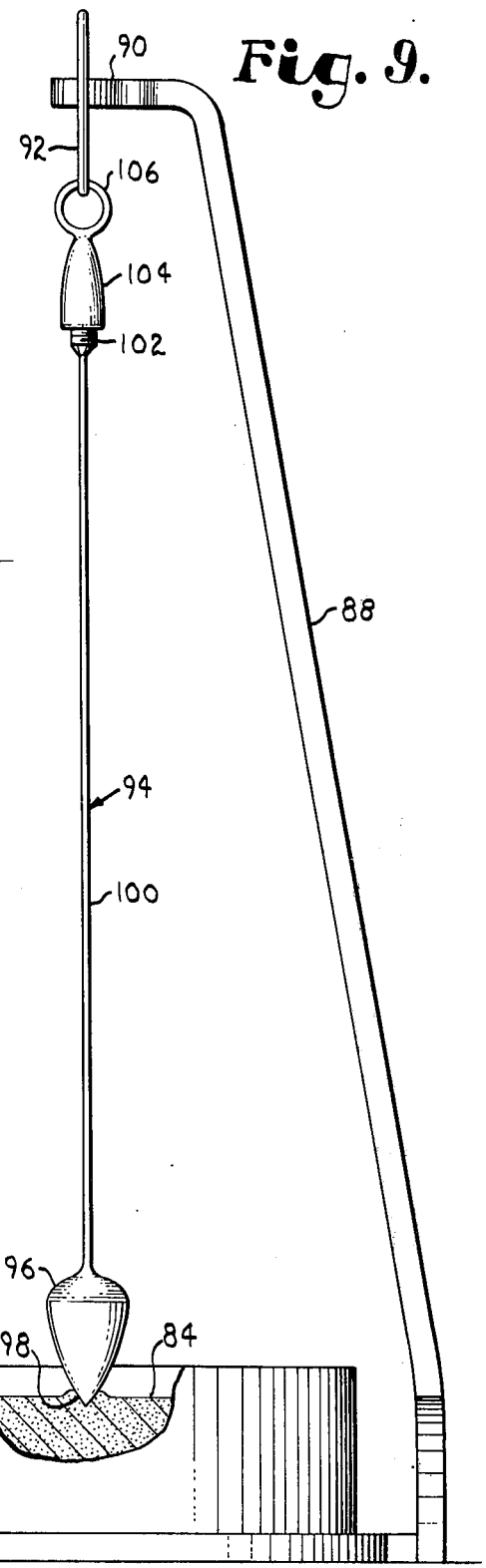
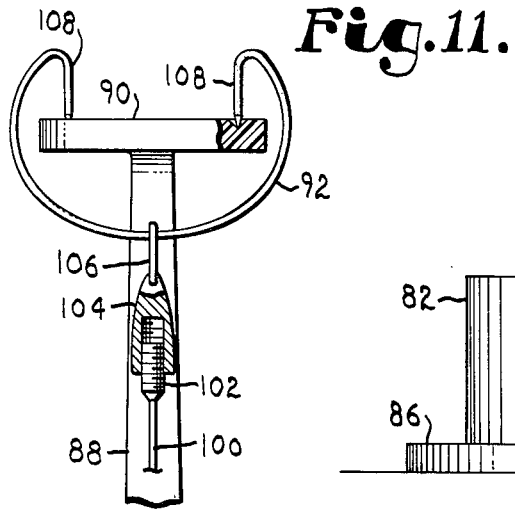

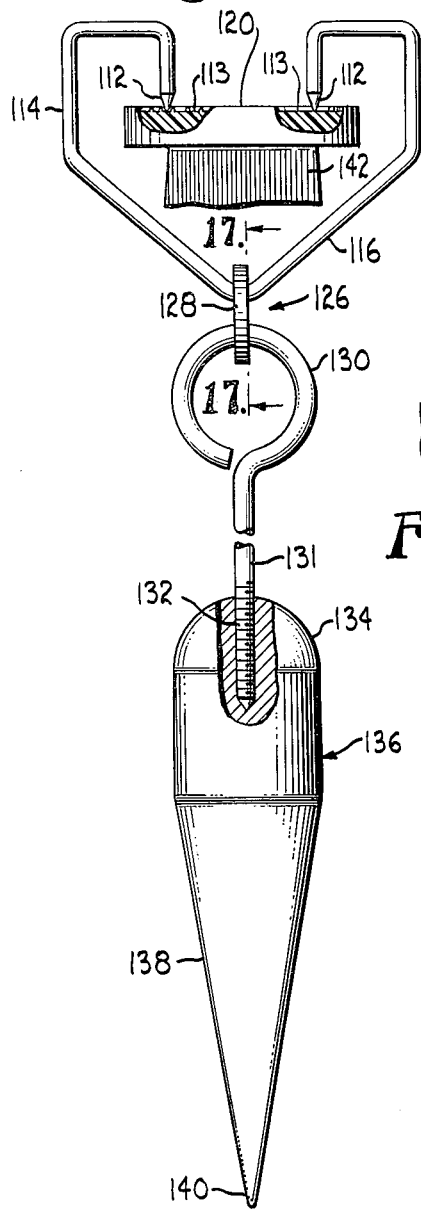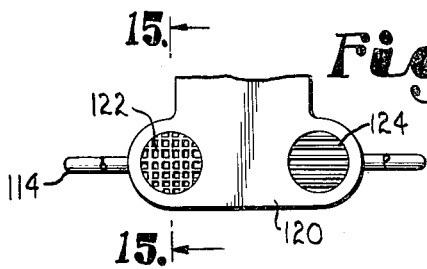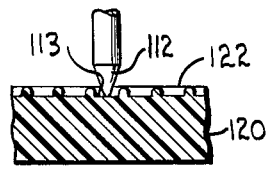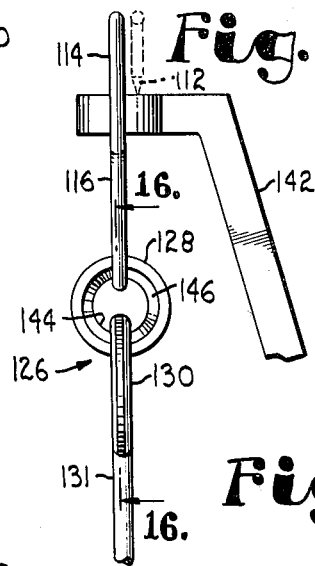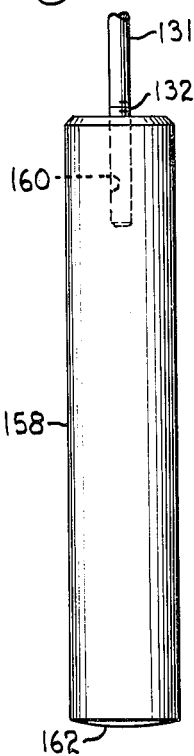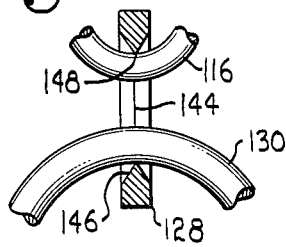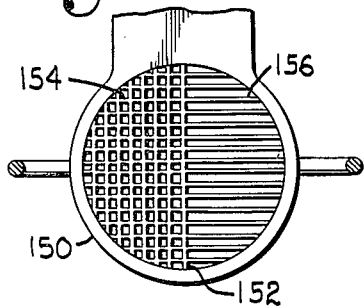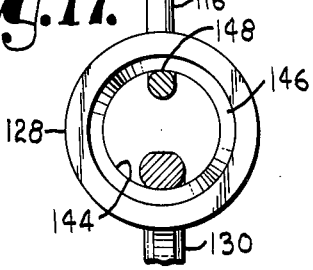

PENDULUM DEVICE

CROSS REFERENCE

This application is a continuation-in-part of my co-pending application, Ser. No. 576,725, filed May 12, 1975, now abandoned.

This invention relates to improvements in kinetic sculpture apparatus of the type employing a pendulum to inscribe patterns in a bed of fine, particulate material.

I have heretofore designed and constructed pendulum devices in the nature of a kinetic sculpture which creates elliptical patterns in a bed of fine, particulate material such as silica banding sand. The lower end of the pendulum has a tapered tip that provides a scribe which penetrates the surface of the bed as the pendulum swings. The pendulum is suspended in a manner such that its primary movement is confined to swinging back and forth about a fixed, horizontal axis, with a secondary coupling also being employed beneath the primary axis to provide motion from side to side and thereby permit universal movement of the pendulum. The elliptical pattern configuration produced varies greatly depending upon the position from which the pendulum is initially released relative to the primary horizontal axis.

Through the use of the suspension arrangement briefly described above, the pendulum is caused to swing in varying elliptical paths and to periodically change its direction of rotation to create an interesting and intricate pattern. The hills and valleys created by the moving scribe appear as lines in the bed, particularly when directional lighting is applied at a low angle from the side of the bed. Such lighting casts shadows into the valleys and illuminates the tops of the ridges to add sharpness in contrast to the three-dimensional linear pattern. As the pattern is being inscribed by the moving pendulum, the motion and the pattern being created produce a very soothing effect on the viewer.

To maximize the effect of a kinetic sculpture of this type, it is necessary that the pivotal suspension for the pendulum be as frictionless as possible so that the movement of the pendulum will be significantly impeded only by the contact of the scribe with the bed of sand or other material. Furthermore, the more intricate the patterns capable of being produced, the greater the satisfaction of certain viewers. It is also desirable to provide some means of adjusting the depth of penetration of the scribe into the bed so that the viewer may control the depth and width of the lines of the pattern, preferably with the capability of adjustment while the pendulum is actually in motion and tracing a pattern. Additionally, it should be convenient for the user to smooth and shape the bed at the outset, or when it is desired to erase the previous pattern and inscribe a new one.

Accordingly, it is an important object of the present invention to provide an improved kinetic sculpture apparatus of the type described, which maximizes the freedom of pendulum movement so as to increase the duration that the pendulum remains in operation after being released from a selected initial position.

Another important object of this invention is to provide such a kinetic sculpture apparatus in which the intricacy of the patterns produced is enhanced to add to the satisfaction of the viewer and the creativity of the sculpture.

Still another important object of the invention is to provide an apparatus as aforesaid in which the depth of penetration of the scribe is readily adjustable by the viewer to control the depth and width of the lines of patterns made in the bed, and hence provide for selective control of the character of the patterns produced.

Yet another important object of the invention is to provide an apparatus as aforesaid having a variable weight pendulum whose momentum may be selected by the viewer in accordance with the pattern configuration and intricacy desired.

Also, another important object of the invention is to provide an apparatus as aforesaid having a setup device capable of effective shaping and smoothing of the bed of material, and hence providing for a more desirable upper surface ready for sculpturing.

In the drawings:

FIG. 3 is a side elevation view (with parts broken away and revealed in cross-section) of the apparatus of FIGS. 1 and 2 on the same scale as FIG. 2, illustrating a modified pendulum of variable weight and showing the motion of the pendulum and the swaying action of the standard in phantom lines;

FIGS. 6, 7 and 8 are progressive, diagrammatic plan views of the bed of the apparatus showing the action of the pendulum in making a pattern;

FIG. 9 is a side elevational view of a second embodiment of the apparatus of the present invention;

FIG. 10 is a plan view of the apparatus shown in FIG. 9, a portion of the rocker element being broken away to reveal its construction;

FIG. 11 is a fragmentary, frontal view partially in elevation and partially in section illustrating the suspension arrangement and elevation control employed in the apparatus of FIGS. 9 and 10;

FIG. 12 is a fragmentary, frontal view partially in elevation and partially in section illustrating components which produce a modified form of the second embodiment of the present invention, such modified form being shown in FIGS. 12-19;

FIG. 13 is a fragmentary, top plan view of the components shown in FIG. 12 with portions of the rocker element broken away;

FIG. 14 is a fragmentary, side elevational view of the rotary coupling and two-point rocker suspension shown in FIG. 12;

FIG. 15 is an enlarged, fragmentary, cross-sectional view taken along line 15-15 of FIG. 13, showing a point bearing in a selected socket;

FIG. 16 is an enlarged, fragmentary, cross-sectional view taken along line 16—16 of FIG. 14 with the bail element and loop component shown in elevation for clarity;

FIG. 17 is an enlarged, fragmentary, cross-sectional view taken along line 17—17 of FIG. 12;

FIG. 18 is a view similar to FIG. 13 showing an alternative upper surface configuration for the support element; and FIG. 19 is an elevational view of a setup device connected to the rod of the pendulum.

Figure 1:
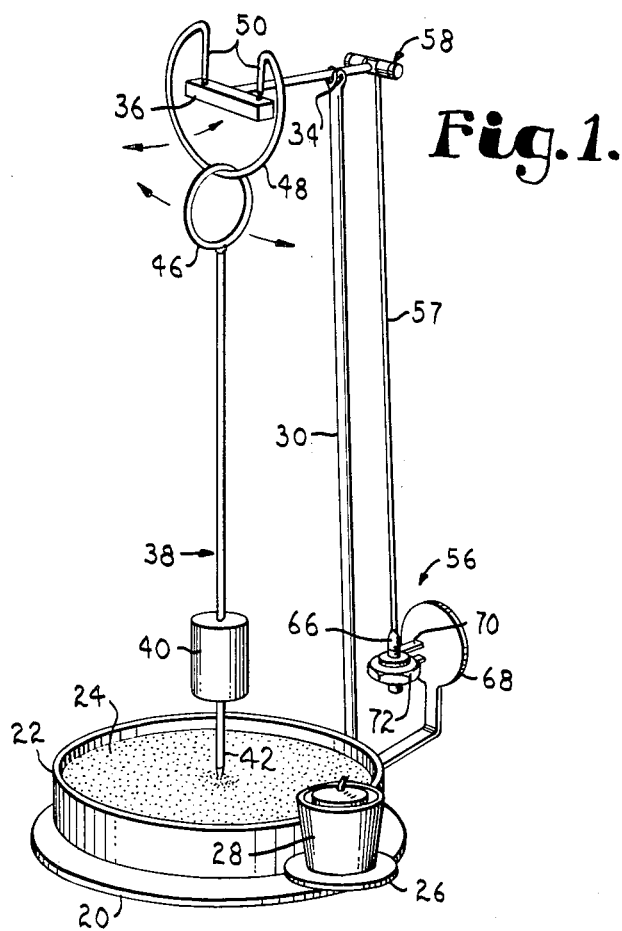
FIG. 1 is a perspective view of one embodiment of the apparatus of the present invention.

Referring first to FIGS. 1-5, the kinetic sculpture apparatus there illustrated is of all metal construction and has a circular baseplate 20 adapted to rest on a floor, table top or stand (not shown) to accommodate the height of the apparatus and the preference of the viewer. A receiver 22 on the baseplate 20 is formed by a relatively short, cylindrical wall of lesser diameter than the baseplate 20 and which extends upwardly therefrom. The receiver 22 contains a bed 24 of fine, particulate material, preferably fine glass beads. I have found that such beads of B 140 grit provide high detail in the finished pattern (to be discussed) and are superior to silica banding sand (50 grit). The bed 24 is initially smoothed to present a flat upper surface.

A circular shelf 26 is welded or brazed to the circular wall of the receiver 22 and supports a candle holder 28. The candle holder 28 is of clear glass so as to not block the side illumination of the bed 24 thus provided. Use of the shelf 26 is optional, as a candle may simply be placed adjacent the receiver 22 as desired.

A standard 30 is anchored at its lower end to the baseplate 20 and extends upwardly therefrom with a slight forward slope as best seen in FIG. 3. The standard 30 may be made of rod stock and, therefore, is transversely resilient as illustrated by the broken lines in FIG. 3. This permits the upper end of the standard 30 to displace by flexure, as will be discussed hereinbelow. The upper end of the standard 30 is slotted to receive a generally horizontally disposed support arm 32, and a pivot pin 34 extends through the slotted end and the arm 32 to provide a horizontal pivotal axis.

The arm 32 is T-shaped as viewed in plan (FIG. 2) in that its forward or inner end is provided with a horizontal crossbar 36 that forms a support element of a two-point rocker suspension. The purpose of the suspension arrangement is to support a pendulum 38 having a weight 40 (FIGS. 1 and 2) adjacent its lower end portion 42. Except for the weight 40, the pendulum 38 is essentially an arm constructed of rod material, the lower end portion 42 presenting a scribe having a conical trip 44. The upper end 46 of the pendulum 38 is presented by a circular ring that provides a secondary coupling which connects the pendulum to a rocker element 48 supported on the crossbar 36.

Figure 4:
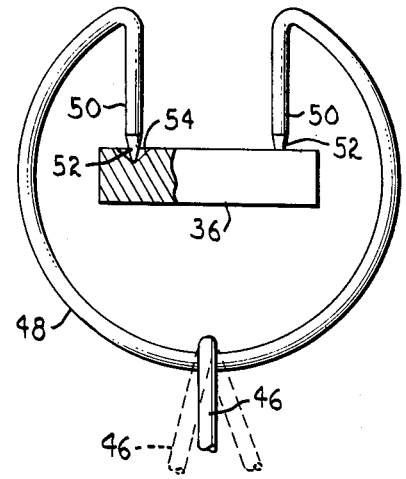
FIG. 4 is a frontal detail of the two-point rocker suspension employed in the appratus of FIGS. 1-3.

More particularly, the rocker element 48 is wirelike and essentially circular in configuration as is most clear in FIG. 4. The end portions 50 of the element 48 are bent back to present vertically downwardly extending prongs having pointed tips 52. These tips 52 of the prongs or projections 50 are received within a pair of shallow sockets 54 in the upper surface of the crossbar 36. Each of the sockets 54 is formed by a conical recess in such upper surface, and each of the tips 52 is likewise of conical shape but is considerably sharper in taper than the corresponding socket 54. Accordingly, the point of each tip 52 and the vertex of the receiving socket 54 cooperate to provide a point bearing of very low friction, the combination of the two point bearings thereby defining a primary horizontal axis 55 (FIG. 2) of swinging movement of the pendulum 38.

The arcuate or U-shaped stretch of the rocker element 48 between the prongs 50 extends beneath the crossbar 36 with complete clearance so that there is no interference with pendulum movement. The rocker element 48 extends through the secondary coupling 46, the plane of the ring of coupling 46 being normally at a right angle to the plane defined by the circularly shaped element 48. This provides for universal movement of the pendulum 38 from a point directly beneath the primary horizontal axis defined by the point bearings.

An elevation control broadly denoted 56 is provided for controlling the height of the pendulum 38 and, accordingly, the depth of penetration of the conical tip 44 into the bed 24. A flexible, upright rod 57 has its upper end connected by a hinge 58 to the outer or rearward end of the support arm 32. The hinge 58 is shown in detail in FIG. 5 where it may be seen that the end of the arm 32 is welded or brazed to a transverse, cylindrical pin 60 that presents a core received within a sleeve 62 secured to the upper end of the rod 57. A central opening 64 in the sleeve 62 extends partially around the sleeve and provides clearance for the end of the arm 32 so that the two hinge parts may undergo limited relative rotation.

The rod 57 provides a linkage between the arm 32 and a threaded stem 66 on the lower end of the rod 57. A bracket 68 is secured to the baseplate 20 and extends therefrom behind the standard 30, and is provided with a pair of retaining elements 70 between which a nut 72 is captured. The external threads of the stem 66 are received by the nut 72, and rotation of the latter causes upward or downward movement of the rod 57 to, in turn, swing the support arm 32 about the horizontal axis provided by the pivot pin 34.

Figure 2:
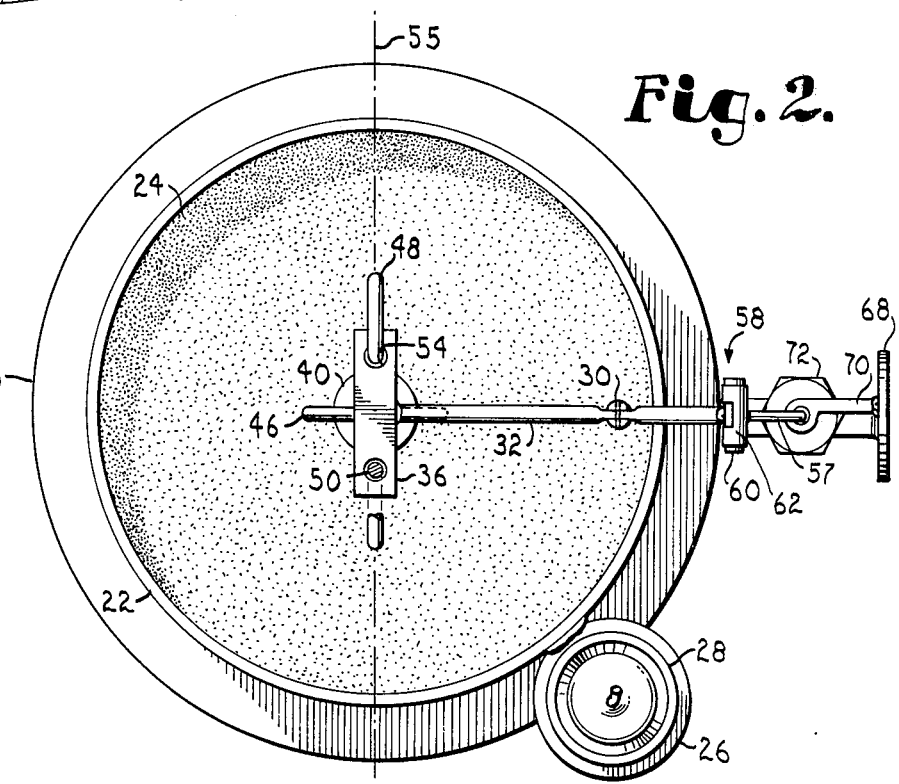
FIG. 2 is a plan view of the apparatus shown in FIG. 1 on a larger scale, a portion of the rocker element being broken away to reveal its construction.
Figure 5:
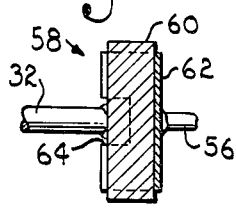
FIG. 5 is an enlarged, horizontal cross-sectional view of the hinge illustrated in FIGS. 1-3 connecting the outer end of the horizontal support arm with the upper end of the linkage rod.

In FIG. 3 a modification of the pendulum 38 is illustrated. In the modified form, the cylindrical weight 40 shown in FIGS. 1 and 2 is replaced with a generally C-shaped carrier 74 having a slender, upright spindle 76 upon which four disc-shaped weights 78 are stacked. Each of the weights 78 has a central aperture of slightly greater diameter than the spindle 76 to permit the weight to be slipped on the spindle and retained thereby as part of the pendulum 38. Being stacked one on top of another, the weights 78 are individually removable from the top so that the viewer may select either one, two, three or all four of the weights in accordance with the pendulum momentum desired. The scribe 42 is axially aligned with the spindle 76 and is threaded into the lower wing of the C-shaped carrier 74; likewise, the upper rod 80 of the pendulum 38 is coaxial with the spindle 76 and the scribe 42 and is threaded into a tapped opening provided in the upper wing of the carrier 74.

The second embodiment of the present invention illustrated in FIGS. 9-11 is similar in a number of significant respects to the embodiment of FIGS. 1-5, but is of somewhat more simplified construction and is designed to be fabricated entirely of plastic material except for the pendulum itself and certain components associated with its suspension and adjustment. A receiver 82 containing a bed 84 of particulate material is formed by a relatively short, cylindrical wall extending upwardly from an essentially circular baseplate 86 as in the first embodiment. A slender, resilient, upright standard 88 has its lower end integrally formed with the baseplate 86 to anchor the standard at the baseplate, the upper end of the standard 88 being bent to a horizontal attitude and shaped to provide a flat, generally triangular support element 90 cooperating with a rocker element 92 to suspend the pendulum 94. The weight 96 of the pendulum 94 forms the lower end thereof and is provided with a tapered tip 98; accordingly, in this embodiment, the weight 96 by virtue of its shape also provides the scribe that contacts the bed 84. A rod 100 extends from the top of the weight 96 to an externally threaded shank 102 that is received within an internally threaded cap member 104 integral with a ring 106 which provides a secondary coupling connecting the pendulum 94 to the rocker element 92. The two mating threaded components comprising the shank 102 and the cap member 104 provide a simple elevation control for the pendulum 94 to set the depth of penetration of the scribe tip 98.

As in the embodiment of FIGS. 1-5, the rocker element 92 is wirelike and of arcuate configuration, the end portions 108 thereof being bent back to present vertically downwardly extending prongs with pointed tips. As is clearly illustrated in FIG. 11, the support element 90 has a pair of shallow conical recesses in its upper surface that present sockets receiving the pointed tips of the prongs 108. Accordingly, a pair of very low friction, point bearings are formed in the same manner as previously described with respect to the first embodiment, and such bearings define the primary horizontal axis 110 (FIG. 10) of swinging movement of the pendulum 94.

The modified form of the second embodiment of the present invention illustrated in FIGS. 12-19 has the same basic structural configuration shown in FIGS. 9-11 withh changes in the suspension and adjustment components and the addition of a setup device 158. Such modified form employs the receiver 82 containing a bed 84 of particulate material on baseplate 86 as described above. A slender, resilient, upright standard 142 has its lower end (not shown) integrally formed with the baseplate 86 to anchor the standard at the baseplate in the same fashion.

The upper end of the standard 142 is bent to a horizontal attitude and shaped to provide a flat support element 120 having a shape as viewed in plan illustrated in FIG. 13. Element 120 presents a generally horizontal upper surface in which two circular groups of sockets 113 are formed, one by a grid network of intersecting ridges 122 and the other by parallel ridges 124 as shown in FIGS. 12 and 13. Alternatively as shown in FIG. 18, the upper end of standard 142 may be shaped to provide a flat, generally circular support element 150 having an upper surface in which a single circular, horizontal pattern 152 of spaced sockets is formed, one-half of the pattern 152 being presented by a grid of intersecting ridges 154 and the remaining half comprising parallel ridges 156, each of which is integral with and forms an extension of a corresponding ridge 154. In both the split pattern of FIG. 13 and the composite pattern 152 of FIG. 18, the intersecting ridges 122 and 154 extend respectively parallel to and at right angles to the primary horizontal axis 110 illustrated in FIG. 10. The parallel ridges 124, though spaced from the intersecting ridges 122, are aligned therewith as is clear from viewing FIG. 13.

The wirelike rocker element 114 is similar to rocker element 92 but employs a modified bail 116 of generally V-shaped configuration. Each of the pointed tips 112 of element 114 makes point contact with the flat base of a selected socket as illustrated in FIG. 15 with respect to one of the sockets 113 formed by the ridges 122.

The V-shaped bail 116 cooperates with a two component rotary coupling 126 comprising an annular component 128 and a loop component 130, the latter being presented by the upper end of pendulum rod 131. The lower end of rod 131 is externally threaded at 132 and is received in a tapped opening in the head 134 of a removable weight 136. The head 134 is cylindrical with a rounded top, and therebeneath the weight 136 is conical to form a scribe 138 with a tapered tip 140. The above is best shown in FIG. 12.

As clearly illustrated in FIGS. 14, 16 and 17, the annular component 128 of the two component rotary coupling 126 has a beveled inside surface 146 forming a sharp, continuous, circular inner edge 144. The bottom tip or vertex of the V-shaped bail 116 is encircled by the annular component 128 and is in essentially point contact therewith by virtue of the circular cross-sectional configuration of bail 116 and the sharp circular edge 144 presented by the component 128. The point contact is best seen at 148 in FIGS. 16 and 17. The loop component 130 also extends through the annular component 128 and is supported on the inner edge 144.

The setup device 158 is depicted in FIG. 19 and comprises a cylindrical steel bar which is equal in mass to that of the removable weight 136. The setup device 158 has an axially extending tapped opening 160 in its upper end which receives the external threads 132 on the lower end of rod 131. For shaping and smoothing purposes in preparation for sculpturing, the device has a blunt, rounded bottom 162 to suitably prepare the bed 84 of fine particulate material by smoothing the surface to a concave configuration corresponding to the path traversed by the pendulum.

OPERATION

The manner in which a pattern is inscribed in the bed 24 is depicted diagrammatically in FIGS. 6, 7 and 8 for the first embodiment of FIGS. 1-5. The second embodiment of FIGS. 9-11 and the modification thereof in FIGS. 12-19 operate in identically the same manner. The support arm 32 is shown fragmentarily as a reference; the arm 32 extends generally horizontally at a right angle to the primary horizontal axis of swinging movement of the pendulum 38 defined by the point bearings. In FIG. 6 the point P represents the position of the tip 44 of the pendulum 38 when it is initially released. In this particular illustration, the point P is angularly displaced 45° from the primary horizontal axis as the bed 24 is viewed in plan.

The path A illustrated in FIG. 6 depicts the path traversed by the inscribing tip 44 of the pendulum shortly after release. Note that at this time the pendulum is swinging in an elliptical path in a counterclockwise direction. At the outset, the first stroke of the pendulum is essentially a straight line on a diameter of the circular bed 24; thereafter, the path widens with each trace and becomes ellipsoidal.

The path B in FIG. 6 shows the widest path traversed by the pendulum, which is still somewhat elliptical but nearly circular. Accordingly, FIG. 6 illustrates that the pendulum swings back and forth in ever widening elliptical paths until the path B is reached. It should also be noted that the paths are becoming shorter due to loss of momentum caused by the drag of the tip in the bed of material. Of utmost significance, however, is the fact that in enlarging its path from A to B, the pendulum 38 has gradually shifted its axis of swinging movement by approximately 90°. This is best seen in FIG. 7 viewing path C, which shows the ellipse as it narrows from an almost circular shape at B to a narrower ellipsoidal configuration. Finally, the still narrower ellipsoidal path D is traversed, at which time the pendulum reverses its direction of movement to clockwise as illustrated by the arrows. The action then repeats and the ellipse widens with clockwise movement of the pendulum, ultimately resulting in a path E defining the widest ellipse made by the pendulum after reversal. As the ellipse E illustrates, the pendulum's axis has now returned to the original axis at the time of initial release from the point P. The ellipse E narrows as before and the action repeats itself with repeated reversals so long as the pendulum has sufficient momentum. In the pattern formation illustrated by the sequence of FIGS. 6, 7 and 8, the momentum of the pendulum is insufficient for a significant second reversal and the ellipse E ultimately closes to the narrow ellipse F shown in FIG. 8 which depicts the smaller oscillations made by the pendulum as it nears the end of its movement.

It may be appreciated that, if all of the passes of the pendulum were illustrated in FIGS. 6, 7 and 8, a very intricate pattern would be revealed in the bed 24. It should also be understood that the pattern formation illustrated and discussed above is only exemplary of one pattern produced by release of the pendulum from a particular point P. The patterns are different depending upon the initial release position and thus are of nearly infinite variety.

In order to increase viewer interest and the creativity and intricacy of the patterns formed, it is necessary that the pendulum suspension be as frictionless as possible so that the drag on the pendulum will be solely the result of contact of the scribe with the bed 24 of particulate material. This freedom is provided by the point bearings of the suspension. Furthermore, the standards 30, 88 and 142, being resilient, sway with the directional pull of the pendulum to assist in maintaining the swinging motion. This results in movement of the primary horizontal axis due to the sway in the standard, with the further result that the scribe is caused to make patterns in the bed of material of greater intricacy than would be the case if the primary axis were fixed.

In the embodiment of FIGS. 1-5, the depth of penetration of the scribe tip 44 may be set while the pendulum is in motion. The shallower the penetration, the more delicate and detailed the pattern. Rotation of the nut 72 raises or lowers the pendulum 38 as desired. Since the scribe tip 44 is of tapered, conical configuration, a greater penetration not only deepens the lines of the pattern but also increases their widths, resulting in higher ridges and a pronounced effect on the paths traversed by the pendulum. In the second embodiment of FIGS. 9-11, the elevation of the pendulum is likewise controllable but is set while the pendulum is at rest by threading the shank 102 into or out of the cap member 104; in FIGS. 12-19 the elevation of the pendulum is similarly controlled by threading rod 131 into or out of the internally threaded head 134 of weight 136.

In the modified pendulum 38 of FIG. 3, the pattern configuration may also be varied by changing the momentum of the pendulum through removal or addition of one or more weights 78. The greater the total weight, the finer will be the pattern produced in the bed 24 for a given pendulum elevation. The pattern is proportionally more intricate and the lines makes a pinstripe effect. As the weight is reduced, the pattern becomes coarser as the lines are more widely spaced and fewer in number, resulting in the production of a simpler pattern configuration.

The modified form of the second embodiment illustrated in FIGS. 12-19 operates the same as the basic form of FIGS. 9-11 except that the suspension and adjustment components have been changed to further reduce friction and to widen the possibilities for different pattern configurations. To prepare the bed of the material 84 in the most appropriate way for each possible pattern configuration, the setup device 158 is also provided.

The peaks of ridges 122 and 124 best seen in FIGS. 12 and 15 are in the same plane as the top surface of support element 120. (The two groups of sockets are formed during the molding process). Every socket 113 is adapted for point contact with one of the pointed tips 112. The parallel ridges 124 are aligned with one of the two series of ridges that form the grid of ridges 122. A pair of sockets is selected by placing a pointed tip 112 of rocker element 114 in an individual socket 113 defined by the intersecting ridges 122, and placing the other tip 112 into any elongated socket 113 between the parallel ridges 124 in radial range of the first socket.

The two selected sockets 113 define the primary horizontal axis of the pendulum. The particular sockets selected determine the location of the primary horizontal axis and the resultant configuration of the inscribed pattern. The sockets formed in the top surface of the circular support element 150 shown in FIG. 18 are utilized in identically the same manner as above, two sockets being selected from the respective semi-circular halves of the horizontal pattern 152 of available sockets. In both of the illustrated arrangements, the selectable sockets provide relatively frictionless receptacles for the pointed tips 112.

The setup device 158 can be attached to the pendulum rod 131 and the device operated about the exact primary horizontal axis that will be used for the weight 136, thereby shaping the bed of material 84 such that the scribe tip 140 will penetrate the bed to a uniform depth throughout. The setup device 158 automatically imparts a concave configuration to the surface of the bed of material that compensates for irregularities in pendulum swing, including the sway in the standard 142, since it has the same mass as the weight 136 and thus follows the same path. Accordingly, the setup device 158 when smoothing will cause the standard 142 to sway in the same way and to the same degree as the weight 136 when sculpturing.

The depth of the setup device 158 is controllable by rotating the device on the threads 132 after removal of the weight 136. The device may first be set at a relatively deep penetration and operated by manually moving rod 131, thereby leaving in the bed of material 84 a pattern of small hills and valleys. By then setting the device 158 to a slight penetration on the same primary horizontal axis, releasing the device and allowing it to swing freely, the surface of the material 84 is made smooth and of the exact desired concave shape for uniform sculpturing with scribe tip 140 using the particular primary axis defined by the same two sockets where pointed tips 112 are placed.

The V-shaped bail 116 is transversely circular and of small diameter with its vertex at essentially one point. The circular inner edge 144 of the annular component 128 is virtually of point width; thus the universal movement of the pendulum, made possible by the point of rotation defined by the V-shaped bail 116 and annular component 128, is relatively frictionless due to the minimal contact of these two parts. This increases the duration of the swing of the pendulum and enhances the pattern configuration.

By operating the setup device 158 in the manner described above, the viewer may select a primary horizontal axis for the device which will center the surface concavity with respect to the bed of material 84. A partial pattern configuration may then be sculptured by selecting a new primary axis which will locate the deepest point of penetration of the scribe tip 140 into the bed of material 84 away from the center of the concavity presented by the prepared surface. After inscribing the partial pattern, a new area of deepest penetration may be defined by again changing the primary horizontal axis.

The process may be repeated as many times as desired depending on how complicated a composite pattern the viewer wishes to inscribe.

This variable as well as the others discussed above accommodates different tastes of the viewer and enables the kinetic sculpture apparatus of the present invention to provide greater satisfaction and a wider range of sculptural creativity.

Having thus described the invention, what is claimed as new and desired to be secured by Letters Patent is:

1. A kinetic sculpture apparatus comprising:
   a base provided with a receiver containing a fine, particulate material presenting a bed thereof,
   a pendulum having an upper end and a lower end, the latter presenting a scribe,
   a standard on said base extending upwardly therefrom,
   means on said standard spaced from said base and suspending said pendulum thereover with said scribe contacting said material, and establishing a primary horizontal axis of swinging movement of the pendulum,
   said upper end of the pendulum being provided with a secondary coupling connecting the pendulum to said suspension means, and
   said standard being vertically elongated and transversely reslient to sway with the directional pull of the pendulum, when the latter is in motion through a sufficient displacement to assist in maintaining pendulum swing and to cause the scribe to make sculptured patterns in the bed of material of greater intricacy.

2. The apparatus as claimed in claim 1, wherein said scribe has a tapered tip normally penetrating said bed of material, and wherein means is provided for controlling the elevation of said pendulum to set the depth of penetration of said tapered tip to thereby control the depth and width of the lines of the patterns.

3. A kinetic sculpture apparatus comprising:
   a base provided with a receiver containing a fine, particulate material presenting a bed thereof;
   a pendulum having an upper end and a lower end, the latter presenting a scribe;
   a standard on said base extending upwardly therefrom;
   a support arm above said base extending over said bed and mounted on said standard for pivotal movement about a generally horizontal axis;
   means suspending said pendulum from said arm with said scribe contacting said material, and establishing a primary horizontal axis of swinging movement of the pendulum,
   said upper end of the pendulum being provided with a secondary coupling connecting the pendulum to said suspension means,
   said scribe having a tapered tip normally penetrating said bed of material; and
   elevational control means connected with said arm for holding the same in a selected position to control the height of said pendulum and thereby set the depth of penetration of said tapered tip, whereby the depth and width of the lines of sculptured patterns made in the bed of material as the pendulum swings may be controlled without interrupting the pendulum's movement.

4. The apparatus as claimed in claim 3, wherein said elevational control means includes an elongated, downwardly extending linkage connected to said arm at a point spaced from its pivotal axis, and a selectively operable device supported on said base and coupled with said linkage for varying its length to, in turn, cause pivotal movement of said arm to the selected position.

5. The apparatus as claimed in claim 3, wherein said suspending means includes a rocker element on said upper end of the pendulum and a support element on said arm, one of said elements having a pair of horizontally spaced projections each provided with a pointed tip, the other of said elements having a pair of spaced sockets receiving corresponding pointed tips, said tips and associated sockets presenting a pair of low friction, point bearings defining said primary axis of swinging movement of the pendulum.

6. The apparatus as claimed in claim 3, wherein said pendulum includes a plurality of individually removable weights and carrier means adjacent its lower end for retaining a selected number of said weights on the pendulum.

7. A kinetic sculpture apparatus comprising:
   a base provided with a receiver containing a fine, particulate material presenting a bed thereof,
   a pendulum having an upper end and a lower end, the latter presenting a scribe,
   means suspending said pendulum over said base with said scribe contacting said material, and including a rocker element on said upper end of the pendulum and a support element cooperating with said rocker element to establish a primary horizontal axis of swinging movement of the pendulum,
   one of said elements having a pair of horizontally spaced projections each provided with a pointed tip,
   the other of said elements having a number of spaced sockets arranged in a horizontal pattern providing alternative pairs of said sockets capable of receiving said tips,
   said tips being received in a selected pair of said sockets to present a pair of low friction, point bearings defining said axis, and
   said upper end of the pendulum being provided with a secondary coupling connecting the pendulum to said rocker element, whereby a sculptured pattern of particular configuration is made in the bed of material by the scribe depending upon the location of said axis determined by the selected sockets and the position from which the pendulum is released relative to said axis.

8. A kinetic sculpture apparatus comprising:
   a base provided with a receiver containing a fine, particulate material presenting a bed thereof,
   a pendulum having an upper end and a lower end, the latter presenting a scribe,
   means connected to said upper end for suspending said pendulum over said base with said scribe contacting said material whereby, when the pendulum is in motion, the scribe makes a sculptured pattern in the bed of material, said means including a plurality of individually selectable primary horizontal axes of swinging movement of said pendulum, said pendulum including a removable weight at its lower end provided with said scribe, and a setup device having means for attaching the device to said pendulum when said weight is removed, said device being provided with a blunt bottom in contact with said material when said device is attached to said pendulum, whereby to smooth and shape the bed of material for subsequent sculpture by operating the pendulum with the device attached to thereby impart a concave configuration to the surface of said bed most appropriate for the selected primary horizontal axis.

9. The apparatus as claimed in claim 8, wherein said weight and said device are of substantially equal mass.

10. The apparatus as claimed in claim 9, wherein said suspending means includes a support which sways with the directional pull of the pendulum when the latter is in motion, whereby use of said device to smooth and shape the bed of material automatically compensates for irregularities in the motion of the pendulum.

11. The apparatus as claimed in claim 8, wherein said device is movable on the pendulum toward and away from said material to control the depth to which said bottom penetrates the material.

12. A kinetic sculpture apparatus comprising:
a base provided with a receiver containing a fine, particulate material presenting a bed thereof, a pendulum having an upper end and a lower end, the latter presenting a scribe, means suspending said pendulum over said base with said scribe contacting said material, and including a rocker element on said upper end of the pendulum and a support element cooperating with said rocker element to establish a primary horizontal axis of swinging movement of the pendulum, and said upper end of the pendulum being provided with rotary coupling means connecting the pendulum to said rocker element, whereby a sculptured pattern of particular configuration is made in the bed of material by the scribe depending upon the position from which the pendulum is released relative to said axis, said rotary coupling means including a loop component on said upper end of the pendulum and an annular component receiving said loop component and said rocker element, said annular component having a beveled inside surface presenting a relatively sharp, continuous inner edge in engagement with said loop component and said rocker element and cooperating therewith to provide an antifriction connection therebetween.

13. The apparatus as claimed in claim 12, wherein said rocker element includes a wirelike bail extending beneath and clear of said support element and through said annular component, said inner edge and said bail being in essentially point contact.

14. A kinetic sculpture apparatus comprising:
a base provided with a receiver containing a fine, particulate material presenting a bed thereof, a pendulum having an upper end and a lower end, the latter presenting a scribe, means suspending said pendulum over said base with said scribe contacting said material, and including a rocker element on said upper end of the pendulum and a support element cooperating with said rocker element to establish a primary horizontal axis of swinging movement of the pendulum, one of said elements having a pair of horizontally spaced projections each provided with a pointed tip, the other of said elements having a number of spaced sockets arranged in a horizontal pattern, and said other element being provided with a generally horizontal surface having a network of intersecting ridges therein presenting at least a portion of said number of sockets, said tips being received in a selected pair of said sockets to present a pair of low friction, point bearings defining said axis, and said upper end of the pendulum being provided with a secondary coupling connecting the pendulum to said rocker element, whereby a sculptured pattern of particular configuration is made in the bed of material by the scribe depending upon the location of said axis determined by the selected sockets and the position from which the pendulum is released relative to said axis.

15. A kinetic sculpture apparatus comprising:
a base provided with a receiver containing a fine, particulate material presenting a bed thereof, a pendulum having an upper end and a lower end, the latter presenting a scribe, means suspending said pendulum over said base with said scribe contacting said material, and including a rocker element on said upper end of the pendulum and a support element cooperating with said rocker element to establish a primary horizontal axis of swinging movement of the pendulum, one of said elements having a pair of horizontally spaced projections each provided with a pointed tip, the other of said elements having a number of spaced sockets arranged in a horizontal pattern, and said other element being provided with a generally horizontal surface having a network of intersecting ridges therein presenting a first group of said sockets adapted to receive one of said tips, and a plurality of parallel ridges therein presenting a second group of said sockets adapted to receive the other of said tips, said tips being received in a selected pair of said sockets to present a pair of low friction, point bearings defining said axis, and said upper end of the pendulum being provided with a secondary coupling connecting the pendulum to said rocker element, whereby a sculptured pattern of particular configuration is made in the bed of material by the scribe depending upon the location of said axis determined by the selected sockets and the position from which the pendulum is released relative to said axis.

* * * * *